2 Sheets—Sheet 1.
C. DOMSCHKE.
Gang-Plow and Cultivator.
No. 198,193. Patented Dec. 18, 1877
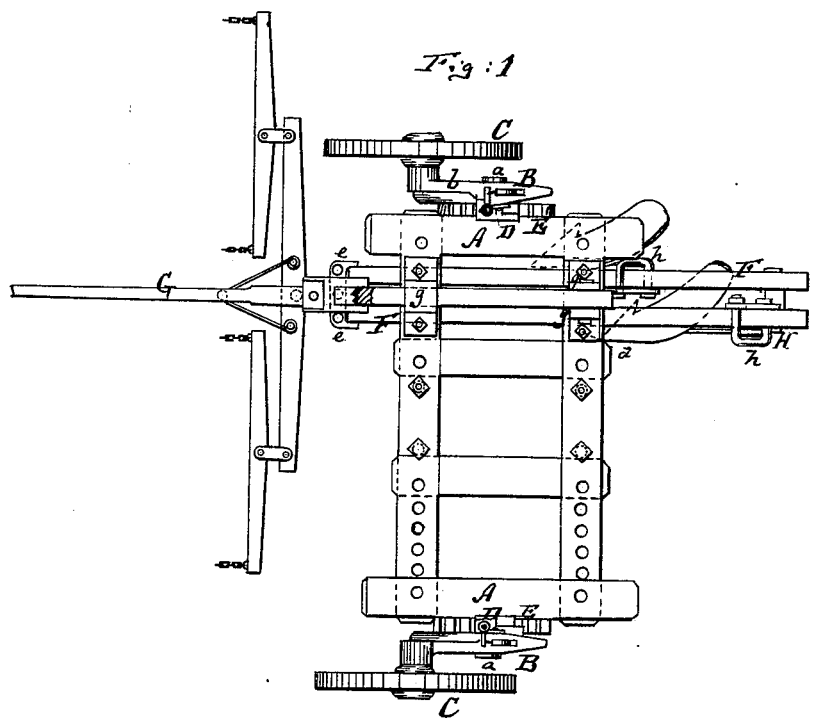
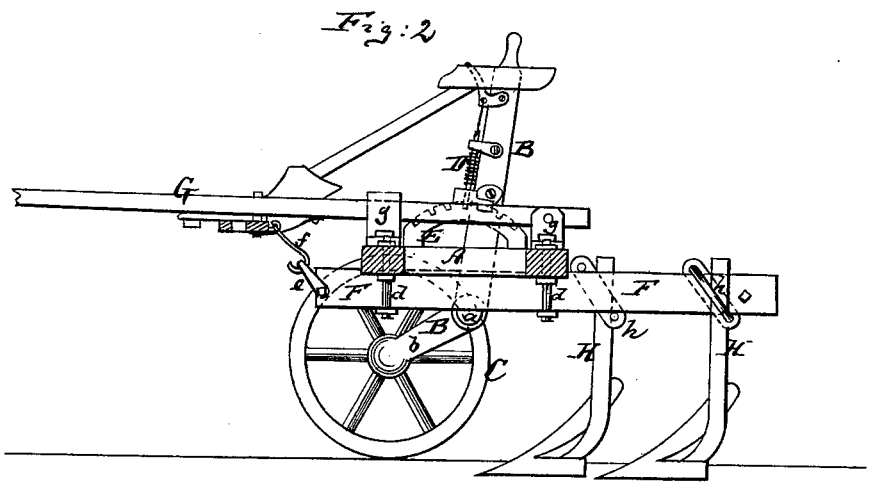
Witnesses:
John C. Tunbridge
A. v. Briesen
Inventor:
C. Domschke
by his attorney
A. v. Briesen
N. PETERS, PHOTO-LITHOGRAPHER, WASHINGTON, D C.

2 Sheets—Sheet 2.
C. DOMSCHKE.
Gang-Plow and Cultivator.
No. 198,193.  Patented Dec. 18, 1877.
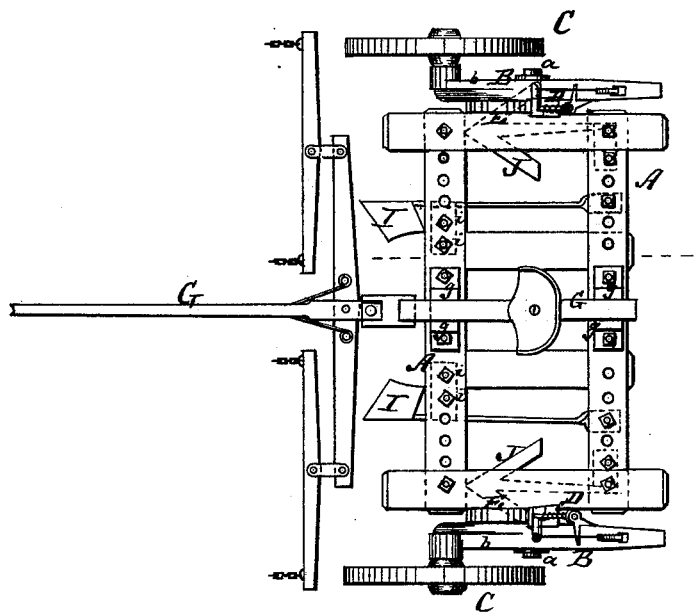
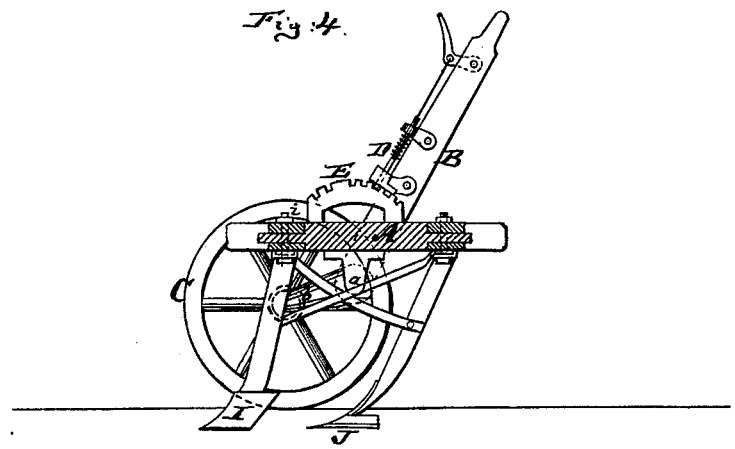
Witnesses:
John C. Tunbridge
A. v. Briesen
Inventor:
C. Domschke
by his attorney
A. v. Briesen

UNITED STATES PATENT OFFICE.

CHARLES DOMSCHKE, OF AUSTIN, TEXAS.

IMPROVEMENT IN GANG-PLOW AND CULTIVATOR.

Specification forming part of Letters Patent No. 198,193, dated December 18, 1877; application filed October 16, 1877.

*To all whom it may concern:*

Be it known that I, CHARLES DOMSCHKE, of Austin, in the county of Travis and State of Texas, have invented a new and Improved Gang-Plow and Cultivator, of which the following is a specification:

In the drawings, Figure 1, Sheet 1, is a plan or top view of my improved apparatus, showing it rigged as a gang-plow. Fig. 2 is a transverse vertical section of the same. Fig. 3, Sheet 2, is a top view thereof, showing it rigged as a cultivator; and Fig. 4 is a transverse vertical section of the same.

Similar letters of reference indicate corresponding parts in all the figures.

This invention relates to a new agricultural machine which may be readily changed from a gang-plow into a cultivator, and vice versa.

The gang-plow is so arranged that land may be given or taken by a convenient adjustment of the draft-clevis, and that the plows themselves are conveniently adjusted on their beams, while their depth in the soil is also easily regulated by adjusting the height of the frame above the axles of the wheels.

To change the plow into a cultivator it is only necessary to detach the beams from the frame, and to attach the tongue, with its removable brackets, to the center of the frame of the apparatus, and apply a series of smaller plows to the lower part of said frame, which frame is provided with a series of holes or slots, to permit the convenient adjustment of the plows as to their distances from each other laterally, and as may be required from the nature of the crop and soil.

The apparatus is intended for use in the Southern States, and it is so arranged as to be equally convenient for oxen as for horses. It may be used for cultivating corn or cotton, and for laying off and opening furrows according to the position of the plows in the cultivator. It may even be used for throwing the land away from hills or rows by the suitable arrangement of the plows on the cultivator.

In the accompanying drawings, with particular reference to Figs. 1 and 2, the letter A represents the horizontal rectangular frame of the apparatus. The same is provided with projecting gudgeons $a\ a$ at its ends, on which are hung elbow-levers B. Each of these levers carries at its lower crank or elbow $b$ a wheel, C, there being thus two wheels that support the frame A on the ground. Each of the levers B is further provided with a sliding spring-catch, D, which engages into a notched segment, E, so that by unfastening said spring-catch, and turning the lever on its gudgeon $a$, the height of the frame A over the soil may be regulated at pleasure, or one end of the frame may be set lower than the other, as desired; and the plows may also be entirely lifted out of the soil by this arrangement. From the lower side of the frame A are suspended loops $d$, through which the plow-beam F is introduced. This plow-beam is, at its front end, provided with a clevis, $e$, into which a hook, $f$, on the tongue or pole G is engaged, as clearly shown in Fig. 2. The back portion of the tongue G is secured in brackets $g\ g$, that are, by bolts, attached to the top of the frame A, near one side of the same, as shown in Fig. 1. The clevis $e$ has several holes, so that by fastening the hook $f$ in either one of said holes, land may be given or taken, inasmuch as by that the direction of the draft on the plow-beam is varied. The plow-standards H H are secured to the plow-beam by means of clamps $h$, which are placed diagonally on the beam and over the standards, as clearly shown in Fig. 2, and which can be drawn tight by the nuts with which they are provided, as clearly shown in Fig. 1. By these clamps the plows may be adjusted on the beam both vertically and longitudinally.

In order now to change the gang-plow represented in Figs. 1 and 2 into a cultivator, the tongue or pole G is first moved to the center of the frame A, as shown in Fig. 3. For this purpose the said frame has holes in it to admit the bolts that secure the brackets $g$ of the tongue either in its central position for the cultivator, or in its side position for the gang-plow. For the cultivator, it is further necessary to entirely remove the plow-beam F, with all its attachments, and instead thereof to attach to the under side of the frame A a series of plows, I I, and "sweeps" J J, as they are termed. The front-cross-bar of the frame has numerous holes for admitting the bolts $i$, by which the standards of the plows I I are secured thereto, as is shown. In like manner is the rear cross-bar of the frame A perforated to admit the bolts that fasten the braces of the plows I and the standards of the sweeps J. The braces of the sweeps J, on the contrary, are fastened by bolts to the front cross-bar, all as clearly shown in Fig. 4. There being thus a number of holes in the cross-bars of the frame A, it is very convenient to adjust the plows at any suitable distance from each other, to reverse them, so that they either throw the land toward each other, or away from each other, or to so reverse them that the sweeps are in front and the plows in rear, or the plows in front and the sweeps in rear, all as may be required for the various purposes of cultivating land.

I claim as my invention—

The combined gang-plow and cultivator-frame A, having a perforated front cross-bar and perforated rear cross-bar, the elbow-levers B B, carrying the adjustable wheels C C, laterally-moving tongue G, and laterally-movable brackets $g$ $g$, all adapted to receive plowshares or cultivators that are attached to the under side of the frame A, substantially as specified.

CHARLES DOMSCHKE.

Witnesses:
    JULIUS BIRNSTIEL,
    KASPAR RYDER.